Sept. 15, 1931.   H. ZANDER   1,823,481
HEAT EXCHANGE DEVICE
Filed Oct. 2, 1928

INVENTOR
Henrik Zander
BY Nathaniel Frucht
his ATTORNEY

Patented Sept. 15, 1931

1,823,481

UNITED STATES PATENT OFFICE

HENRIK ZANDER, OF STOCKHOLM, SWEDEN, ASSIGNOR TO AKTIEBOLAGET LJUNGSTRÖMS ANGTURBIN, OF STOCKHOLM, SWEDEN, A JOINT-STOCK COMPANY

HEAT EXCHANGE DEVICE

Application filed October 2, 1928, Serial No. 309,707, and in Sweden October 12, 1927.

My invention relates to regenerative heat exchange apparatuses and has for its object to provide a more efficient heat transfer within such apparatuses.

Various arrangements of regenerative material have been used in attempts to increase the efficiency of heat transfer between fluid to be heated and fluid being cooled. Tortuous channels as previously used tend to give irregular currents which do not justify the increased power required to force the gases through the passages in consideration for the increase of heat transfer obtained. Straight passages are better than the types of irregular channels which have been used in the past but the rate of heat transmission in this case is dependent on velocity and high velocity means high power input to the fans which move the air.

I retain passages in the general line of flow through the apparatus but do not use channels which are of uniform cross-section. The channels in accordance with the present invention leave straight line passages through the regenerative material but are arranged to alternately compress and expand the gases as they pass through the regenerative material. While the eye can look through the passages of the regenerative material in accordance with the present invention, the passages are irregular in cross-sectional area.

Preferably I employ corrugated plates arranged so that the corrugations in alternate plates are transverse to each other. Furthermore, I prefer to use corrugated plates of different depths of corrugation.

My invention will be more fully described with reference to the accompanying drawings on which:

Figure 2:
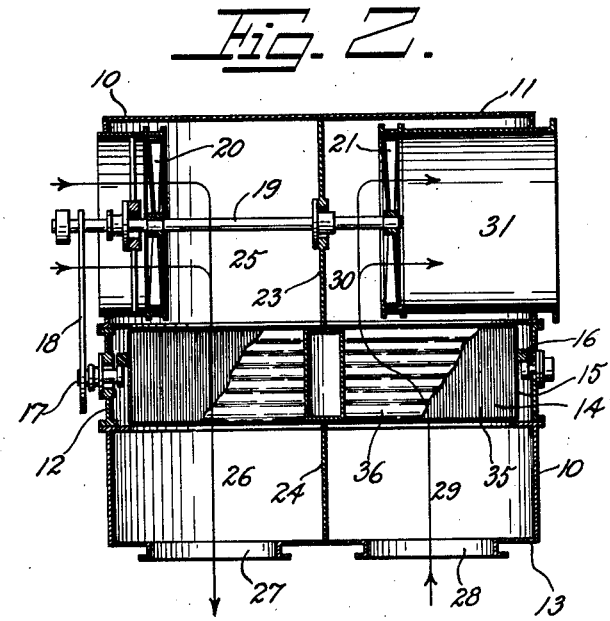
Fig. 2 shows an assembled regenerative air preheater embodying the invention though it is to be understood that this is for illustration only.

Referring more particularly to Fig. 2, reference character 10 designates generally the whole regenerative heat exchanger. As this type is designed for heating air for furnaces by boiler exhaust gases, it will be referred to as an air preheater. The air preheater comprises three sections, an upper fan section 11, an intermediate rotor section 12 and a lower section 13. The intermediate section contains a rotor 14 which is of cylindrical formation and is adapted to rotate within the preheater housing. The framework of the rotor comprises an outer drum 15 to which is attached a ledge 16 which rests on rollers and is suitably guided in its rotation. The rotor is rotated by means of mechanism 17 which is connected by a pulley 18 to shaft 19 on which is mounted fans 20 and 21. Power may be taken from any suitable source to rotate shaft 19 and this at the same time rotates the rotor. The rotor is divided into chambers which may be in the manner shown in United States Patent No. 1,652,025.

Transverse walls 23 and 24 divide the casing into channels for the air to be heated and the gases which are to heat the air. Air enters the casing surrounding fan 20, passes through chamber 25, through the regenerative material at the left hand side of Fig. 2, as shown, through chamber 26 and out at opening 27. Gases pass in through opening 28, through chamber 29, through the right hand part of the regenerative material, through chamber 30 and out through fan 21 and duct 31.

Suitable leakage preventing arrangements may be added.

As the rotor is rotated, the metal of the regenerative mass is heated by the hot flue gases and the hot metal is rotated to the path of the cold air where it heats the air.

Figure 1:
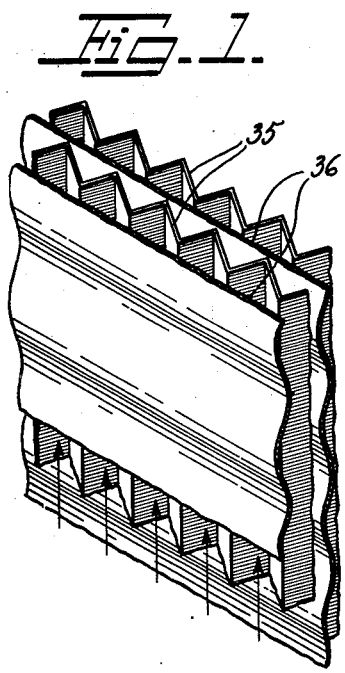
Fig. 1 shows, in perspective, regenerative material for use in a regenerative heat exchange apparatus arranged in accordance with the present invention.

Passages are formed through the regenerative material by means of the arrangement of plates as shown in Fig. 1. One set of plates 35 has corrugations extending in the general line of flow through the heat exchange device. These corrugations would be vertical in the arrangement of Fig. 2, as shown. Alternate plates 36 have their corrugations arranged transversely to the flow of gases. These corrugations are horizontal in Fig. 2. The arrangement of plates has been indicated in Fig. 2. The arrows in Fig. 1 indicate the path of gases when the regenerative material is on one side of the regenerative heater. When the regenerative heater is on the other side, the flow will be in the other direction.

Figure 3:
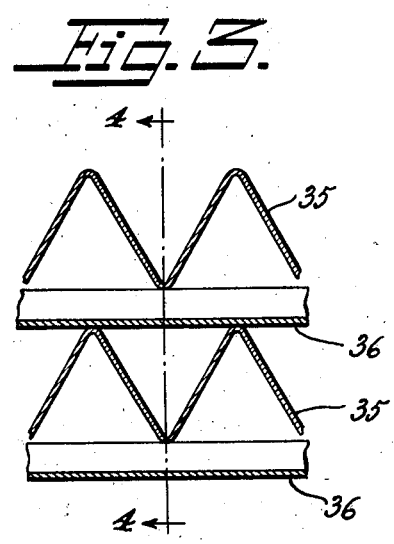
Fig. 3 is a cross-sectional view of a part of the regenerative material transverse to the line of flow.
Figure 4:
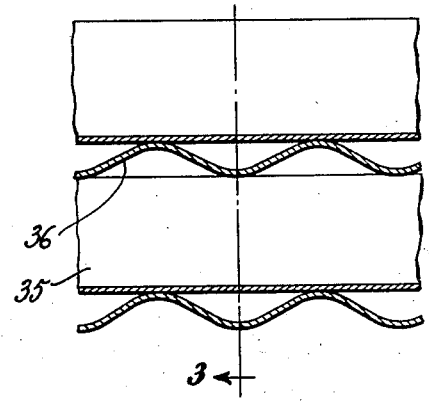
Fig. 4 is a cross-sectional view of part of the regenerative material parallel to the line of flow.

Fig. 3 shows on an enlarged scale the arrangement of plates. It will be noted that plates 35 have sharp corrugations whereas plates 36 have more even corrugations of less depth. Figs. 3 and 4 illustrate the fact that the passages might be said to be straight and yet are of uneven cross-sectional area so that the gases are alternately compressed and expanded in their passage through the apparatus. With this arrangement the layer of gas next to the plates is continuously broken up which gives good heat transfer while at the same time the power necessary to force the gases through the apparatus is kept down to a minimum commensurate with the heat transfer obtained.

It will be understood that variations in design may be made and that the invention is not limited to the type of preheater shown. Instead of rotating the framework containing the regenerative material, the framework may be made stationary and the channels may be rotated.

It will be further understood that the straight parts of the plates 35 could be dented or otherwise may be uneven and that various ways of corrugating and otherwise arranging the plates are possible within the scope of the invention.

What I claim is:—

1. A regenerative heat exchange device comprising regenerative material having passages through the same, channels for a fluid to be heated and a fluid giving off heat, means to change communication between different passages and different channels, said passages extending in the general line of flow through the regenerative material and having different cross-sectional areas at different places.

2. A regenerative heat exchange device comprising metal regenerative material having passages through the same, channels for a fluid to be heated and a fluid giving off heat, means to change communication between different passages and different channels, said passages extending in the general line of flow through the regenerative material and having different cross-sectional areas at different places.

3. A regenerative heat exchange device comprising a cylindrical framework containing a metal regenerative mass arranged to form passages through the same, channels for a fluid to be heated and a fluid giving off heat, means to provide relative rotation between the framework and the channels operative to successively change communication between said passages and different channels, said passages extending in the general line of flow through the regenerative material and having different cross-sectional areas at different places.

4. A regenerative heat exchange device comprising a series of plates forming a regenerative material having passages through the same, channels for a fluid to be heated and a fluid giving off heat, means to change communication between different passages and different channels, the plates being arranged to provide different cross-sectional areas at different places to alternately compress and expand the gases in their passage through the regenerative material.

5. A regenerative heat exchange device comprising a cylindrical framework containing a metal regenerative mass arranged to form passages through the same, channels for a fluid to be heated and a fluid giving off heat, means to provide relative rotation between the framework and the channels operative to successively change communication between said passages and different channels, said metal regenerative mass comprising plates arranged to provide different cross-sectional areas at different places to alternately compress and expand the gases in their passage through the regenerative material.

6. A regenerative heat exchange device comprising metal regenerative material having passages through the same, channels for a fluid to be heated and a fluid giving off heat, means to change communication between different passages and different channels, said regenerative material comprising alternate corrugated plates, the corrugations of alternate plates extending in the line of flow through the regenerative material and alternate plates having their corrugations extending transversely to the line of flow.

7. A regenerative heat exchange device comprising a cylindrical framework containing a metal regenerative mass arranged to form passages through the same, channels for a fluid to be heated and a fluid giving off heat, means to provide relative rotation between the framework and the channels operative to successively change communication between said passages and different channels, said regenerative mass comprising nested corrugated plates, alternate corrugated plates having corrugations extending in the general line of flow through the regenerative material and intermediate plates having their corrugations extending transversely to the line of flow.

8. Apparatus in accordance with claim 6 wherein the transverse corrugations are of less depth than the corrugations arranged in the general line of flow.

9. Apparatus in accordance with claim 6 wherein the corrugations arranged transversely of the line of flow are of less depth than the corrugations arranged in the general line of flow.

10. A heat exchange device comprising metal regenerative material having passages through the same, channels for a fluid to be heated and a fluid giving off heat, means to change communication between different passages and different channels, said passages extending in the general line of flow through the regenerative material and means for varying the velocity of flow of the fluids through said passages.

11. A heat exchange device comprising metal regenerative material having passages through the same, channels for a fluid to be heated and a fluid giving off heat, means to change communication between different passages and different channels, said passages extending in the general line of flow through the regenerative material and means for producing alternate compression and expansion of the fluids flowing through said passages.

12. In a heat exchange device, metal regenerative material having flow passages through the same, means for alternately passing a fluid to be cooled and a fluid to be heated through said flow passages, and means for varying the velocity of the fluids during their flow through the flow passages.

13. In a heat exchange device, metal regenerative material having flow passages through the same, means for alternately passing a fluid to be cooled and a fluid to be heated through said flow passages, and means for gradually and alternately increasing and decreasing the velocity of the fluids during their flow through the flow passages.

14. In a heat exchange device, metal regenerative material having flow passages through the same, and means for alternately passing a fluid to be cooled and a fluid to be heated through said flow passages, said flow passages having different cross-sectional areas at different portions thereof.

15. In a heat exchange device, metal regenerative material having flow passages through the same, and means for alternately passing a fluid to be cooled and a fluid to be heated through said flow passages, said flow passages having gradually varying cross-sectional areas.

In testimony whereof I affix my signature.

HENRIK ZANDER.